United States Patent
Steinhardt et al.

(10) Patent No.: US 10,360,476 B2
(45) Date of Patent: Jul. 23, 2019

(54) SENSOR SYSTEM COMPRISING A FUSION FILTER FOR COMMON SIGNAL PROCESSING

(75) Inventors: Nico Steinhardt, Franfurt (DE); Jens Martin, Frankfurt am Main (DE)

(73) Assignee: CONTINENTAL TEVES AG & CO. OHG, Frankfurt (DE)

( * ) Notice: Subject to any disclaimer, the term of this patent is extended or adjusted under 35 U.S.C. 154(b) by 1090 days.

(21) Appl. No.: 14/344,248

(22) PCT Filed: Sep. 12, 2012

(86) PCT No.: PCT/EP2012/067877
§ 371 (c)(1),
(2), (4) Date: Feb. 6, 2015

(87) PCT Pub. No.: WO2013/037854
PCT Pub. Date: Mar. 21, 2013

(65) Prior Publication Data
US 2015/0142390 A1   May 21, 2015

(30) Foreign Application Priority Data

Sep. 12, 2011 (DE) .................. 10 2011 082 534
Sep. 12, 2011 (DE) .................. 10 2011 082 535
(Continued)

(51) Int. Cl.
*G06K 9/62* (2006.01)
*G01C 21/16* (2006.01)
(Continued)

(52) U.S. Cl.
CPC .......... *G06K 9/624* (2013.01); *B60R 16/0231* (2013.01); *G01C 21/165* (2013.01);
(Continued)

(58) Field of Classification Search
CPC ................ G06K 9/624; G06K 9/00503; B60R 16/0231; G08C 19/24; G01S 19/47; G01C 21/165; B60T 2250/06; B60T 2210/36
See application file for complete search history.

(56) References Cited

U.S. PATENT DOCUMENTS 6,081,230 A * 6/2000 Hoshino .............. G01C 21/165
342/357.32
2003/0019468 A1 * 1/2003 Winner ................... B60T 8/885
123/319
(Continued)

FOREIGN PATENT DOCUMENTS

DE          200 23 781 U1    7/2006
DE    10 2005 004 568 A1    8/2006
(Continued)

OTHER PUBLICATIONS

An Introduction to Inertial Navigation—Oliver J. Woodman—Aug. 2007.
(Continued)

*Primary Examiner* — Elias Desta
(74) *Attorney, Agent, or Firm* — Brinks Gilson & Lione

(57) ABSTRACT

A sensor system includes a plurality of sensor elements and a signal processing device. The plurality of sensor elements detect at least in part different primary measurement variables and utilize at least in part different measurement principles. The signal processing device is configured to evaluate the sensor signals of the sensor elements.

6 Claims, 1 Drawing Sheet

(30) Foreign Application Priority Data

| Sep. 12, 2011 | (DE) | 10 2011 082 539 |
| Sep. 12, 2011 | (DE) | 10 2011 082 548 |
| Sep. 12, 2011 | (DE) | 10 2011 082 549 |
| Sep. 12, 2011 | (DE) | 10 2011 082 551 |
| Sep. 12, 2011 | (DE) | 10 2011 082 552 |
| Nov. 21, 2011 | (DE) | 10 2011 086 710 |
| May 2, 2012 | (DE) | 10 2012 207 297 |

(51) Int. Cl.
*G01S 19/47* (2010.01)
*G08C 19/24* (2006.01)
*B60R 16/023* (2006.01)
*G06K 9/00* (2006.01)

(52) U.S. Cl.
CPC .......... *G01S 19/47* (2013.01); *G06K 9/00503* (2013.01); *G08C 19/24* (2013.01); *B60T 2210/36* (2013.01); *B60T 2250/06* (2013.01)

(56) References Cited

U.S. PATENT DOCUMENTS

| 2004/0102900 A1 | 5/2004 | Ibrahim et al. |
| 2007/0067078 A1 | 3/2007 | Salman et al. |
| 2008/0309552 A1 | 12/2008 | Alexander |
| 2009/0222204 A1 | 9/2009 | Roberts et al. |
| 2010/0019963 A1* | 1/2010 | Gao ............ G01S 5/0027 342/357.31 |
| 2010/0106356 A1 | 4/2010 | Trepagnier et al. |
| 2010/0109945 A1 | 5/2010 | Roh |
| 2010/0253602 A1 | 10/2010 | Szczerba et al. |
| 2011/0153266 A1 | 6/2011 | Shankwitz et al. |
| 2013/0052614 A1* | 2/2013 | Mollicone ...... G09B 19/167 434/65 |
| 2013/0138264 A1* | 5/2013 | Hoshizaki ...... G01C 21/165 701/1 |
| 2013/0144476 A1* | 6/2013 | Pinto ............ B60T 8/17555 701/22 |
| 2014/0136015 A1* | 5/2014 | Hayakawa ........... B60T 7/22 701/1 |

FOREIGN PATENT DOCUMENTS

| DE | 10 2006 026 937 A1 | 1/2007 |
| DE | 10 2006 029 148 A1 | 1/2008 |
| DE | 10 2010 063984 A1 | 8/2011 |
| EP | 2 128 645 A1 | 12/2009 |
| WO | WO 2005/062984 A2 | 7/2005 |
| WO | WO 2007/143806 A2 | 12/2007 |

OTHER PUBLICATIONS

International Search Report.
Using Natural Features for Vision Based Navigation of a Indoor-VTOL MAV—Aerospace Science and Technology—2009.

* cited by examiner

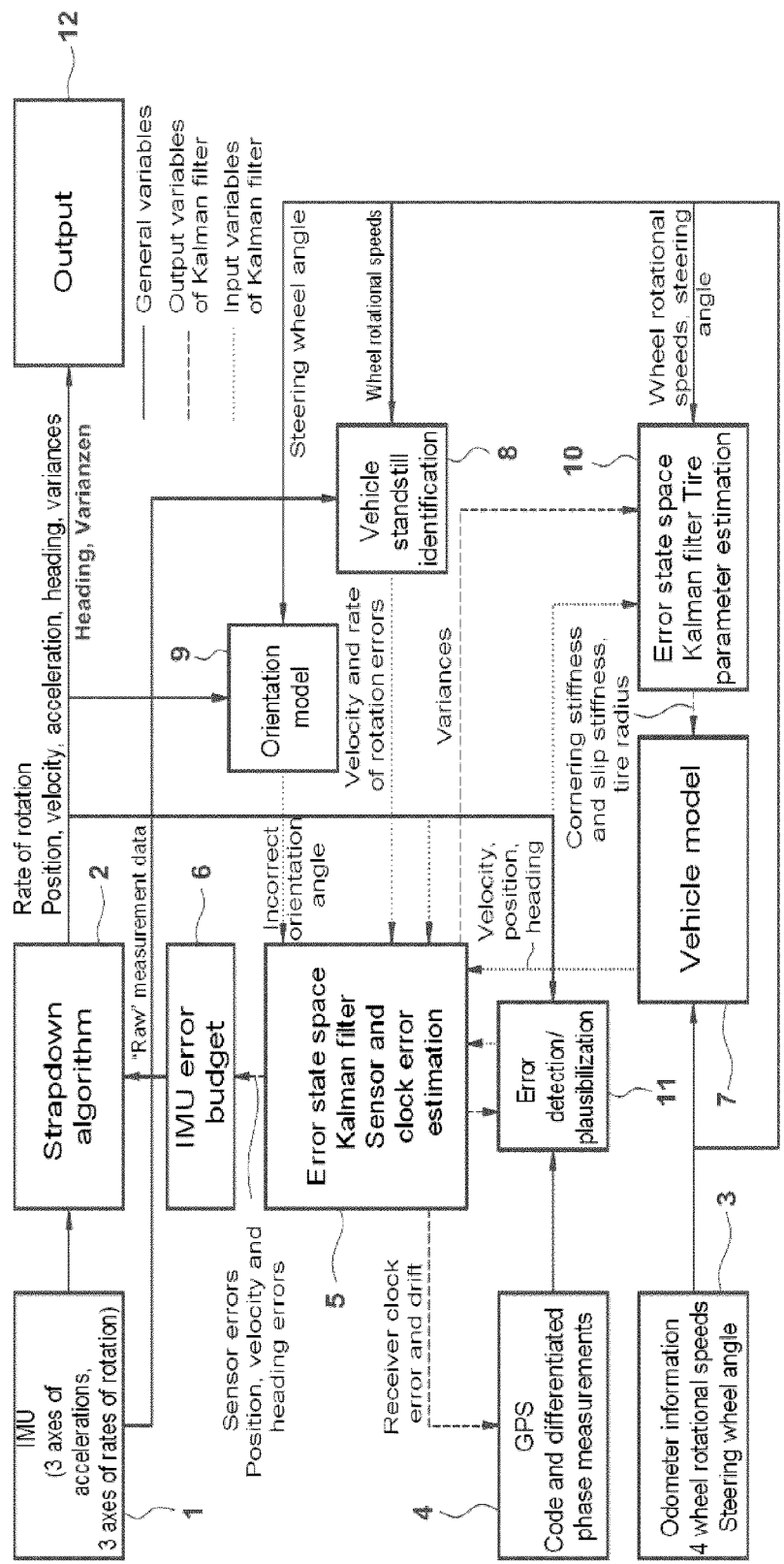

SENSOR SYSTEM COMPRISING A FUSION FILTER FOR COMMON SIGNAL PROCESSING

CROSS REFERENCE TO RELATED APPLICATIONS

This application claims priority to German Patent Application Nos. 10 2011 082 534.7, filed Sep. 12, 2011; 10 2011 082 535.5, filed Sep. 12, 2011; 10 2011 082 539.8, filed Sep. 12, 2011; 10 2011 082 548.7, filed Sep. 12, 2011; 10 2011 082 549.5, filed Sep. 12, 2011; 10 2011 082 551.7, filed Sep. 12, 2011; 10 2011 082 552.5, filed Sep. 12, 2011; 10 2011 086 710.4, filed Nov. 21, 2011; 10 2012 207 297.7, filed May 2, 2012; and PCT/EP2012/067877, filed Sep. 12, 2012.

FIELD OF THE INVENTION

The invention relates to a sensor system according to the preamble of claim 1 and to the use thereof in motor vehicles, in particular in automobiles.

BACKGROUND

The published patent application DE 10 2010 063 984 A1 describes a sensor system, comprising a plurality of sensor elements and a signal processing device, wherein the signal processing device is designed such that the output signals of the sensor elements are evaluated jointly.

SUMMARY AND INTRODUCTORY DESCRIPTION

The invention is based on the object of proposing a sensor system which offers or enables a relatively high accuracy with regard to its signal processing and/or which is suitable for safety-critical applications or a safety-critical use.

This object is achieved by means of the sensor system according to claim 1.

The fusion filter is designed as a Kalman filter, alternatively as a particle filter, or alternatively as an information filter or alternatively as an "unscented" Kalman filter.

It is preferred for the fusion filter to be designed such that the fusion data set comprises, as the value of the at least one physical variable, a relative value, in particular an offset value and/or change value and/or correction value and/or error value.

It is expedient for the relative values of the respective physical variables of the fusion data set to be correction values which are assigned in each case variation information or a variation or variation measure, in particular a variance, as information about the data quality thereof.

It is preferred for the fusion filter to be designed such that the value of at least one physical variable of the fusion data set is calculated on the direct or indirect basis of sensor signals of a plurality of sensor elements, wherein said sensor elements detect said at least one physical variable redundantly in a direct or indirect manner. This redundant detection is particularly realized direct or parallel redundancy and/or realized as analytical redundancy, from computationally derived or deduced variables values and/or model assumptions.

The fusion filter may be designed as a Kalman filter which iteratively carries out at least prediction steps and correction steps and provides at least in part the fusion data set. In particular, the fusion filter is designed as an error state space extended sequential Kalman filter, that is to say as a Kalman filter which comprises a linearization, and in which error state information is calculated and/or estimated and/or which operates sequentially and in this case uses/takes account of the input data available in the respective function step of the sequence.

It is expedient for the sensor system to have an inertial sensor arrangement, comprising at least one acceleration sensor element and at least one rate-of-rotation sensor element, and for the sensor system to comprise a strapdown algorithm unit, in which a strapdown algorithm is carried out, by means of which at least the sensor signals of the inertial sensor arrangement are processed to form, in particular corrected, navigation data and/or driving dynamics data, relative to the vehicle in which the sensor system is arranged.

It is particularly preferred for the strapdown algorithm unit to provide its calculated navigation data and/or driving dynamics data to the fusion filter directly or indirectly.

The sensor system may have an inertial sensor arrangement, which is designed such that it can detect at least the acceleration along a second defined axis, in particular the transverse axis of the vehicle, and at least the rate of rotation about a third defined axis, in particular the vertical axis of the vehicle, wherein the first and third defined axes form a generating system, and in this case are oriented in particular perpendicularly to one another, wherein the sensor system additionally has at least one wheel rotational speed sensor element, in particular at least or exactly four wheel rotational speed sensor elements, which detect the wheel rotational speed of a wheel or the wheel rotational speeds of a respective one of the wheels of the vehicle and in particular additionally detect the direction of rotation of the assigned wheel of the vehicle in which the sensor system is arranged, wherein the sensor system additionally comprises at least one steering angle sensor element which detects the steering angle of the vehicle, and wherein the sensor system furthermore comprises a satellite navigation system, which is designed in particular such that it detects and/or provides the distance data in each case between the assigned satellite and the vehicle or a variable dependent thereon and velocity information data in each case between the assigned satellite and the vehicle or a variable dependent thereon.

Particularly, the inertial sensor arrangement may be designed such that it can detect at least the accelerations along a first, a second and a third defined axis and at least the rates of rotation about said first, about said second and about said third defined axis, wherein said first, second and third defined axes form a generating system, and in this case are oriented in particular in each case perpendicularly to one another.

It is preferred for the inertial sensor arrangement to provide its sensor signals to the strapdown algorithm unit, and the strapdown algorithm unit to be designed such that it calculates and/or provides at least from the sensor signals of the inertial sensor arrangement and in particular at least one item of error state information and/or variance and/or information about the data quality, which is assigned to a sensor signal or a physical variable and is provided by the fusion filter, as measurement variables and/or navigation data and/or driving dynamics data at least corrected accelerations along the first, the second and the third defined axis, at least corrected rates of rotation about these three defined axes, at least one velocity relative to these three defined axes, and at least one position variable.

It is expedient for the sensor system to be designed such that in each case at least one sensor signal and/or a physical variable as direct or derived variable of the inertial sensor arrangement and/or of the strapdown algorithm unit, of the wheel rotational speed sensor elements and of the steering angle sensor element, in particular indirectly via a vehicle model unit, and of the satellite navigation system, here in particular distance data in each case between the assigned satellite and the vehicle or a variable dependent thereon and velocity information data in each case between the assigned satellite and the vehicle or a variable dependent thereon, are provided to the fusion filter and taken into account by the fusion filter during the calculations thereof.

It is particularly preferred for the vehicle model unit to be designed such that, from the sensor signals of the wheel rotational speed sensor elements and of the steering angle sensor element, the velocity along the first defined axis, the velocity along the second defined axis, and the rate of rotation about the third defined axis are calculated.

It is especially preferred for the vehicle model unit to be designed such that it uses for calculation a least square error method for solving an overdetermined system of equations, in particular as a least squared error method.

It is expedient for the vehicle model unit to be designed such that it takes into account during its calculation at least the following physical variables and/or parameters
a) the steering angle of each wheel, detected in particular by the steering angle sensor for the two front wheels, wherein the model assumption is made that the steering angle of the rear wheels is equal to zero or that the steering angle of the rear wheels is additionally detected,
b) the wheel rotational speed or a variable dependent thereon of each wheel,
c) the direction of rotation of each wheel,
d) the dynamic radius and/or wheel diameter of each wheel, and
e) the track width of each axle of the vehicle and/or the wheel base between the axles of the vehicle.

The signal processing device may be designed such that the fusion filter calculates and/or provides and/or outputs the fusion data set at defined points in time.

The fusion filter may be designed such that it calculates and/or provides and/or outputs the fusion data set independently of the sampling rates and/or sensor signal output points in time of the sensor elements, in particular of the wheel rotational speed sensor elements and of the steering angle sensor element, and independently of temporal signal or measurement variable or information output points in time of the satellite navigation system.

It is expedient for the signal processing device to be designed such that in the course of a function step of the fusion filter always, in particular asynchronously, the newest—available to the fusion filter—information and/or signals and/or data of the sensor elements, in particular of the wheel rotational speed sensor elements and of the steering angle sensor element, directly or indirectly, in particular by means of the vehicle model unit, and of the satellite navigation system directly or indirectly, are sequentially updated and/or included in the fusion filter and are taken into account during the calculation of the assigned function step of the fusion filter.

It is preferred for the sensor system to have a standstill identification unit, which is designed such that it can identify a standstill of the vehicle and, in the case of an identified standstill of the vehicle, provides information from a standstill model at least to the fusion filter, in this case in particular the information that the rates of rotation about all three axes have the value zero and at least one position change variable likewise has the value zero and, in particular, the velocities along all three axes have the value zero.

It is preferred for the signal processing device to calculate and/or to use a first group of data of physical variables whose values relate to a vehicle coordinate system, and wherein the signal processing device additionally calculates and/or uses a second group of data of physical variables whose values relate to a world coordinate system, wherein said world coordinate system is suitable in particular at least for describing the orientation and/or dynamic variables of the vehicle in the world, wherein the sensor system has an orientation model unit, which calculates the orientation angle between the vehicle coordinate system and the world coordinate system, wherein the orientation angle between the vehicle coordinate system and the world coordinate system is calculated in the orientation model unit at least on the basis of the following variables: the velocity relative to the vehicle coordinate system, the velocity relative to the world coordinate system, and in particular the steering angle.

It is expedient for the following terms to be used synonymously, that is to say to mean the same when implemented technically: offset value, change value, correction value and error value.

Error state information may be understood to mean error information and/or error correction information and/or variation information and/or variance information and/or accuracy information.

The term variance may be understood to mean the term variation, wherein, in particular in the case of a general fusion filter, the latter in each case assigns a variation or a variation value to each value of a physical variable of the fusion filter, and, in the case of a Kalman filter as fusion filter, a variance is in each case assigned to each value of a physical variable of the fusion filter.

It is expedient for the first, second and third defined axes to be defined relative to a coordinate system of the vehicle in which the sensor system is implemented, as follows: the first defined axis corresponds to the longitudinal axis of the vehicle, the second defined axis corresponds to the transverse axis of the vehicle, and the third defined axis corresponds to the vertical axis of the vehicle. These three axes form, in particular, a Cartesian coordinate system.

It is preferred for the fusion filter to be designed such that its data, in particular the physical variables or the data of the physical variables of the fusion data set, are divided into blocks which are always of constant size and which are processed iteratively in an arbitrary order in the fusion filter, that is to say that the fusion filter carries out a sequential update with regard to its input data. In this case, the fusion filter may be designed such that the filter equations are adapted, and so the computational result of the sequential update in each step of the fusion filter is an update, that is to say a data update, for all measurement variables of the input data of the fusion filter.

The sensor system is expediently arranged in a vehicle, in particular a motor vehicle, such as an automobile.

The sensor system may be designed such that data of the satellite navigation system, in particular position data, are assigned timestamp information describing substantially the point in time of measurement of said data. The timestamp information of the respective datum of the satellite navigation system is provided together with said respective datum to the fusion filter and taken into account during the internal calculation in the fusion filter.

The data of further or all sensor elements and/or of the inertial sensor arrangement are likewise assigned such timestamp information, which is likewise provided together with the respective datum to the fusion filter and taken into account during the internal calculation in the fusion filter. Expediently, with regard to the data of the satellite navigation system, the respective timestamp information is generated by the satellite navigation system itself.

It is preferred that, in the case of the additional timestamp information of the further sensor elements and/or of the inertial sensor arrangement, the respective timestamp information is generated by the signal processing device, in particular depending on the time measurement of the satellite navigation system.

A function step of the fusion filter comprises at least one prediction step and a correction step. In this case, the fusion filter is of iterative design and performs function steps iteratively, one after another. In particular, within each function step of the fusion filter, data or values or signals are read in, that is to say that input data are taken into account, and that is to say that data or values or signals are also output, that is to say provided as output data.

The fusion filter may be designed such that the fusion filter carries out a plurality of updating steps within a function step, said updating steps relating to the loading or use or updating of input data or signals. The fusion filter goes in particular sequentially through all input variables or input signals and in each case checks whether new items of information/data are present. If so, the latter are accepted into the filter or the items of information/data in the filter are updated; if not, the current value is maintained and the filter checks the next input or the next input variable or the next input signal.

The strapdown algorithm unit may provide at least absolute values of physical variables, in particular absolute values for the acceleration, the rate of rotation, the velocity, here in each case relative to the three axes the vehicle and/or world coordinate system, and a position and the orientation angle. The values with respect to these variables are in this case may all provided as corrected values/variables by the strapdown algorithm unit.

It is expedient for the inertial sensor arrangement to clock and/or trigger the fusion filter; in particular, each fusion step formed by the fusion filter is triggered by the inertial sensor arrangement or at least one output signal or output datum.

It is preferred for the strapdown algorithm unit to be designed such that it has a start vector of physical variables and/or a start value of the position, in particular with regard to the start of the sensor system, may after each switch-on of the sensor system. The strapdown algorithm unit receives this start vector and/or this start position from the satellite navigation system via the fusion filter.

It is expedient for the data of the fusion filter, in particular the fusion data set thereof, to map a virtual sensor or to correspond thereto.

The term sensor elements may be understood to mean the wheel rotational speed sensor elements, the at least one steering angle sensor element, the sensor elements of the inertial sensor arrangement and in particular additionally also the satellite navigation system.

It is preferred, if generally a variable and/or value are/is specified with regard to the three defined axes, for this to be meant relative to the vehicle coordinate system and/or the world coordinate system.

It is expedient for the fusion data set, which comprises values of the physical variables, to comprise a relative value, for example a correction value, also called offset value, and to provide it in particular to the strapdown algorithm unit. By way of example, this respective correction value results in each case from the cumulated error values or change values that are provided by the fusion filter.

It is preferred for the signal processing device to calculate and/or use a first group of data of physical variables whose values relate to a vehicle coordinate system, and wherein the signal processing device additionally calculates and/or uses a second group of data of physical variables whose values relate to a world coordinate system, wherein said world coordinate system is suitable in particular at least for describing the orientation and/or dynamic variables of the vehicle in the world, wherein the sensor system has an orientation model unit, which calculates the orientation angle between the vehicle coordinate system and the world coordinate system.

The vehicle coordinate system and/or the world coordinate system may be designed as three-axis Cartesian coordinate systems. In this case, the vehicle coordinate system is defined, in particular, such that the first axis is the longitudinal axis of the vehicle, the second axis is the transverse axis of the vehicle and the third axis is the vertical axis of the vehicle.

It is preferred for the orientation angle between the vehicle coordinate system and the world coordinate system to be calculated in the orientation model unit at least on the basis of the following variables: the velocity relative to the vehicle coordinate system, the velocity relative to the world coordinate system, and in particular the steering angle.

The signal processing device may comprise a sensor fusion module having a fusion filter, which provides a defined fusion data set in the course of the joint evaluation of at least the sensor signals and/or signals derived therefrom of the sensor elements, wherein said fusion data set has in each case data with respect to defined physical variables, wherein the fusion data set comprises, with respect to at least one physical variable, a value of said physical variable and information about the data quality thereof, and wherein the fusion filter is designed such that the fusion data set comprises, as the value of the at least one physical variable, a relative value, in particular an offset value and/or change value and/or correction value and/or error value. It is particularly preferred for the relative values of the respective physical variables of the fusion data set to be correction values and for the information about the data quality of the values physical variables to be variances.

It is expedient for the sensor system to have an inertial sensor arrangement, comprising at least one acceleration sensor element and at least one rate-of-rotation sensor element, and for the sensor fusion module to comprise a strapdown algorithm unit, in which a strapdown algorithm is carried out, by means of which at least the sensor signals of the inertial sensor arrangement are processed to form, in particular corrected, navigation data and/or driving dynamics data, relative to the vehicle in which the sensor system is arranged.

It is preferred for the orientation angle between the vehicle coordinate system and the world coordinate system to be calculated in the orientation model unit additionally at least on the basis of one or more of the following variables: orientation information of the vehicle relative to the world coordinate system, some or all of the correction values and/or variances of the fusion filter and/or the acceleration of the vehicle relative to the vehicle coordinate system and/or the world coordinate system.

It is expedient for the orientation model unit to use some or all of the output data and/or output signals of the strapdown algorithm unit for calculation.

It is preferred for the orientation model unit to be designed such that, in addition to the orientation angle, it also calculates and provides information about the data quality of this variable, in particular the variance of the orientation angle, wherein the orientation model unit provides the orientation angle between the vehicle coordinate system and the world coordinate system and the information about the data quality of this variable to the fusion filter, and the fusion filter uses this orientation angle in its calculations and p may forward the information about the data quality of this variable, in particular the variance of the orientation angle, to the strapdown algorithm unit.

It is expedient for the orientation model unit to be designed such that, in addition to the orientation angle, it also calculates and provides information about the data quality of this variable, in particular the variance of the orientation angle, wherein the orientation angle is provided to the strapdown algorithm unit and/or is overwritten therein with the output value of the orientation model unit, and wherein the information about the data quality of this variable, in particular the variance of the orientation angle, is provided to the fusion filter and/or is overwritten therein with the output value of the orientation model unit.

The sensor system may comprise a satellite navigation system designed such that it detects the distance data in each case between the assigned satellite and the vehicle or a variable dependent thereon and velocity information data in each case between the assigned satellite and the vehicle or a variable dependent thereon and provides them to the fusion filter, and the fusion filter uses these variables in its calculations.

It is preferred for the orientation model unit to be designed such that it takes account of at least one or a plurality or all of the following model assumptions in its calculations: the total velocity of the vehicle relative at least to the longitudinal and/or transverse axis thereof is greater than zero, the average velocity of the vehicle in the direction of/along the vertical axis thereof is equal to zero, no skew running of the tires occurs and/or the vehicle follows its wheel steering angles substantially without deviations.

It is expedient for the orientation angle between the vehicle coordinate system and the world coordinate system to be calculated in the orientation model unit additionally at least on the basis of one or a plurality of the following variables: the wheel rotational speeds of wheel rotational speed sensor elements of the vehicle and the steering angle or the calculated wheel angles, wherein, with the wheel rotational speeds and the steering angle or the wheel angles, by means of difference formation, the rate of rotation of the vehicle about the vertical axis thereof is determined and/or the rate of rotation of the vehicle about the vertical axis thereof relative to the vehicle coordinate system, provided by the strapdown algorithm unit.

It is preferred for the orientation angle between the vehicle coordinate system and the world coordinate system to be calculated in the orientation model unit additionally at least on the basis of one or more of the following variables: orientation information of the vehicle relative to the world coordinate system, some or all of the correction values and/or variances of the fusion filter, position information of the vehicle relative to the vehicle coordinate system and/or the world coordinate system, and/or the acceleration of the vehicle relative to the vehicle coordinate system and/or the world coordinate system.

The orientation model unit may be designed such that at least one of the following boundary conditions for the model validity is checked during each implementation and the results are discarded upon non-compliance:

the angle increments must be sufficiently small or be limited in order to be linearizable with a small error (Eulerian angles)

accelerations and kinematic constraints of the axles as a result of large steering locks have to be sufficiently small in order that the instantaneous pole of the movement is constant.

The orientation model unit is expediently designed such that it carries out at least one of the following operations and/or steps:

Inclusion of wheel rotational speed measurements allows, by means of difference formation, the determination of the desired rate of rotation about the vertical axis, which together with the actual rate of rotation from the strapdown algorithm unit supplies an additional measurement variable.

Direct correction of the torsion or of the orientation angle in the strapdown algorithm unit between vehicle-fixed and navigation coordinates or between vehicle coordinate system and the world coordinate system in the case of large deviations using at least one or all of the Eulerian equations.

It is preferred for the first, the second and the third defined axis to form a generating system, and in this case to be oriented in particular perpendicularly to one another.

The vehicle model unit may be designed such that it uses for calculation a least square error method for solving an overdetermined system of equations, in particular as a least squared error method.

It is preferred for in each case one of the wheel rotational speed sensor elements to be assigned to each wheel of the vehicle, wherein the vehicle model unit is designed such that, from the sensor signals of the wheel rotational speed sensor elements and the steering angle, provided by the steering angle sensor unit, and/or the steering angle of each wheel, in particular detected by the at least one steering angle sensor element for the one or in each case for the plurality of steered/steerable axles and/or by at least one model assumption for one or a plurality of non-steered/non-steerable axles, said vehicle model unit directly or indirectly calculates the velocity components and/or the velocity, of each wheel, along/relative to the first and the second defined axis, wherein, from these velocity components relative to the respective wheels and/or the velocities in each case relative to the first and second defined axes of the assigned wheels, the velocity along a first defined axis, the velocity along a second defined axis and the rate of rotation about a third defined axis are calculated.

It is expedient for the sensor system to have four wheel rotational speed sensor elements, wherein in each case one of the wheel rotational speed sensor elements is assigned to each wheel of the vehicle, wherein the vehicle model unit is designed such that, from the sensor signals of the wheel rotational speed sensor elements and the steering angle, provided by the steering angle sensor unit, and/or the steering angle of each wheel, in particular detected by the steering angle sensor element for the front wheels and from a model assumption or at least by means of a further steering angle sensor element for the rear wheels, said vehicle model unit directly or indirectly calculates the velocity components and/or the velocity, of each wheel, along/relative to the first and the second defined axis, wherein, from these eight velocity components and/or the four velocities in each case relative to the first and second defined axes, the velocity along a first defined axis, the velocity along a second defined axis and the rate of rotation about a third defined axis are calculated.

It is preferred for the steering angle of each wheel to be determined or calculated, from a steering wheel angle sensor element, that is to say a sensor element which detects the steering angle as desired by the driver, and information about the steering transmission characteristic curve, which is stored in particular in the vehicle model unit or in a different part of the signal processing device.

It is expedient for the vehicle model unit to be designed such that it takes into account during its calculation at least the following physical variables and/or parameters
a) the steering angle of each wheel, detected in particular by the steering angle sensor for the two front wheels, wherein the model assumption is made that the steering angle of the rear wheels is known, in particular the steering angle of the rear wheels is equal to zero or that the steering angle of the rear wheels is additionally detected,
b) the wheel rotational speed or a variable dependent thereon of each wheel,
c) the direction of rotation of each wheel,
d) the dynamic radius and/or wheel diameter of each wheel or a variable derived therefrom as a parameter which is taken into account or estimated and/or calculated in particular as a constant value known to the model, and
e) the track width of each axle of the vehicle and/or the wheel base between the axles of the vehicle.

The vehicle model unit may be designed such that it takes account of at least one of the following physical variables and/or parameters in its calculation:
f) the slip angle of each wheel, calculated in particular from the transverse acceleration, that is to say the acceleration in the direction of the second defined axis, and/or
g) the wheel slip, calculated in particular from wheel forces and/or accelerations of each wheel.

It is preferred for the signal processing device to comprise a tire parameter estimation unit, which is designed such that it calculates and/or estimates at least the radius, in particular the dynamic radius, of each wheel or a variable dependent thereon or derived therefrom and provides it to the vehicle model unit as an additional input variable.

The tire parameter estimation unit may be designed such that it additionally calculates and/or estimates the cornering stiffness and the slip stiffness or longitudinal slip stiffness of each wheel or a variable dependent thereon or derived therefrom and provides them to the vehicle model unit as an additional input variable, wherein the tire parameter estimation unit is designed such that it uses in particular a substantially linear tire model for calculating the wheel/tire variables.

Expediently, the tire parameter estimation unit is designed such that it receives as input variables the wheel rotational speeds and the steering angle, at least partly or completely the output variables or values of the strapdown algorithm unit, in particular the variances provided thereby in addition to the values of the physical variables, and the variances of the fusion filter, with respect to the physical variables which are the input variables of the tire parameter estimation unit.

It is preferred for the vehicle model unit to be designed such that, with respect to each of its three calculated variables of the velocity along a first defined axis, the velocity along a second defined axis and the rate of rotation about a third defined axis, said vehicle model unit calculates information about the data quality and provides it as an additional output variable, in particular in each case a variance.

It is expedient for the vehicle model unit to be designed such that, on the basis of the calculated variances, said vehicle model unit assesses the validity of its own output variables, and in this case takes account of, in particular, the respective variance of the velocity along the first and along the second defined axis and the rate of rotation about the third defined axis in the assessment of the validity of its own output variables.

The vehicle model unit may be designed such that it checks the respective variance of its three output variables with regard to exceeding a or a respective defined limit value, wherein, in the case of one or more of the variances being exceeded, there is no validity of the current output variables of the vehicle model unit.

It is preferred for the vehicle model unit and/or the tire parameter estimation unit to be designed such that these comprise at least one linearization. This linearization is in particular only carried out or has the boundary parameter that the total acceleration of the vehicle, that is to say the acceleration relative to all three defined axes, is less than 5 m/s$^2$ in terms of magnitude.

It is expedient for the first, second and third defined axes to be defined relative to a coordinate system of the vehicle in which the sensor system is implemented, as follows: the first defined axis corresponds to the longitudinal axis of the vehicle, the second defined axis corresponds to the transverse axis of the vehicle, and the third defined axis corresponds to the vertical axis of the vehicle. These three axes form in particular a Cartesian coordinate system, in particular a vehicle coordinate system.

It is preferred for the vehicle model unit to be designed such that it carries out or supports a direct or indirect measurement of the wheel loads and/or wheel contact forces and provides this at least variable as an output variable.

It is expedient for the vehicle model unit to be designed such that it comprises the modeling of a wheel suspension, with regard to a kinematic and/or dynamic model, as a result of which, taking account of this modeling, a steering angle is or can be calculated with increased accuracy. Said steering angle relates, in particular, to the steering angle of each wheel, which is used in each case for the further calculation of the output variables of the vehicle model unit.

The steering angle of the rear wheels is expediently detected by means of at least one additional rear wheel steering angle sensor element. In particular additionally or alternatively the actuator system of a rear axle steering system provides the steering angle of the wheels of the rear axle.

The signal processing device of the sensor system additionally may comprise a fusion filter. The fusion filter provides a defined fusion data set in the course of the common evaluation of at least the sensor signals and/or signals derived therefrom of the sensor elements, that is to say of the odometer information, and in particular additionally of the output signals of a satellite navigation system and/or signals derived therefrom. Said fusion data set has in each case data with respect to defined physical variables, wherein the fusion data set comprises, with respect to at least one physical variable, a value of said physical variable and information about the data quality thereof, wherein this information about the data quality is fashioned as variance in accordance with the example.

The fusion data set comprises, as the value of the at least one physical variable, a relative value, for example a correction value, also called offset value or change value or error value.

The relative values of the respective physical variables of the fusion data set are therefore expediently correction values and variances.

The values of the physical variables of the fusion data set may be calculated on the direct or indirect basis of the sensor signals of the sensor elements and of the satellite navigation system, wherein at least some variables, for example the velocity and the position of the vehicle in relation to the vehicle coordinates, are redundantly detected and utilized.

The fusion filter is expediently designed as an error state space extended sequential Kalman filter, that is to say as a Kalman filter which comprises a linearization, in particular, and in which the correction values are calculated and/or estimated and which operates sequentially and in this case uses/takes account of the input data available in the respective function step of the sequence.

The vehicle model unit provides its output variables or output data, that is to say at least the velocity along a first defined axis, the velocity along a second defined axis and the rate of rotation about a third defined axis, preferably to the fusion filter, which takes account of or uses said output variables or output data of the vehicle model unit in its calculations, that is to say the calculations of the fusion filter.

The dynamic radius of each wheel or the dynamic tire radius is preferably defined as follows: effectively covered distance during a tire revolution. The latter does not correspond to the radius of the tire, since the radius of the tire effectively decreases as a result of spring deflection under load. Influencing variables that can alter the tire radius including during a journey are e.g. traveling velocity, air pressure and temperature.

The variable referred to as longitudinal slip $\lambda$ is expediently defined as follows: under longitudinal force influence, a slip movement arises as a result of the deformation of the tread elements of the tire, without taking account of the tire sliding on the road. Said slip movement has the consequence that the tire, depending on the longitudinal force, rotates faster or more slowly than should be expected over the tire radius. The extent to which this effect is manifested is influenced principally by the rubber mixture and the type of tire and is characterized by the longitudinal slip stiffness:

$$c_\lambda = \frac{F_x}{\lambda}.$$

Skew running or the slip angle $\alpha$ is preferably defined as follows: in a manner similar to that in the case of longitudinal slip, lateral forces, perpendicularly to the rolling direction, cause a sideways movement of the tire as a result of the rubber elasticity. This relationship is characterized by the cornering stiffness:

$$c_\alpha = \frac{F_y}{\alpha}.$$

In order to compensate for these disturbing variables, the vehicle model unit preferably has recourse to a linear tire model of the tire parameter estimation unit or includes it in the calculations. Said model is restricted in particular to accelerations or total accelerations of the vehicle $$< 5 \frac{m}{s^2}.$$

In this range, it is particularly preferably assumed, in particular as a model assumption for the calculation, that the relationship between longitudinal slip and skew running and the associated forces is linear, and that the forces that can be transmitted rise linearly with the contact force $F_N$ or normal force on the tire. By canceling the vehicle mass, this allows a normalization of the variables to accelerations. In this case, the vehicle masses and accelerations are expediently related to individual wheels, but assumed to be statically distributed:

$$r_{dyn} = \frac{2\pi \cdot \Delta \varphi_{wheel}}{s_{x,absolute,tire}}$$

$$\lambda = \frac{F_x}{F_N \cdot c_\lambda} = \frac{m_{Fzg} \cdot a_{x,Fzg}}{m_{Fzg} \cdot g \cdot c_\lambda} = \frac{a_{x,Fzg}}{g \cdot c_\lambda}$$

$$\alpha = \frac{F_y}{F_N \cdot c_\alpha} = \frac{m_{Fzg} \cdot a_{y,Fzg}}{m_{Fzg} \cdot g \cdot c_\alpha} = \frac{a_{y,Fzg}}{g \cdot c_\alpha}$$

In this case, the following preferably hold true:
$\Delta \varphi_{wheel}$: Angle of rotation of the wheel measured from wheel ticks
$s_{x,absolute,tire}$: Distance actually covered over the road
g: Acceleration due to gravity The following preferably ensue therefrom for the distances covered:

$$\Delta_{x,wheel} = \frac{2\pi \cdot \Delta \varphi_{wheel}}{r_{dyn}} \cdot \frac{1 - \lambda_a}{1 + \lambda_b}$$

$$\Delta_{y,wheel} = \Delta_{x,wheel} \cdot \tan \alpha$$

In this case, the following preferably hold true:
$\lambda_a$: Drive slip during acceleration
$\lambda_a$: Braking slip during deceleration According to the example, therefore, it is the case that the slip variable that is respectively not applicable in the traveling situation=0.

Since the accelerations used are known from the navigation calculation, the actual planar movement of the vehicle over the roadway can be estimated in a model-based manner preferably given a known tire radius and known cornering and longitudinal slip stiffness. A possible torsion of tire coordinates relative to the vehicle coordinates is expediently taken into account by means of the measured steering wheel angle and the known steering transmission. The distances and velocities of the individual wheels are preferably calculated as follows in the vehicle model unit:
calculation of accelerations and rates of rotation at the center of gravity of the vehicle
transformation to tire coordinates
calculation of the velocities/distances using the tire model and the wheel angular momenta or wheel rotational speeds
inverse transformation into vehicle coordinates Preferably, two measurement variables ($\Delta X_{wheel}$, $\Delta Y_{wheel}$ in vehicle coordinates) per wheel, that is to say a total of eight measured values, are available after the conclusion of these steps.

It is preferred for the tire parameter estimation unit to be designed such that it carries out a method for estimating tire parameters for a vehicle, comprising the following steps:
measuring a reference movement of the vehicle;
modeling a model movement of the vehicle on the basis of a model freed of the tire parameters to be estimated; and
estimating the tire parameters of the vehicle on the basis of a comparison of the reference movement and the model movement.

The method comprises in particular additionally the following step:

detecting the real velocity of the vehicle at wheel contact points of the vehicle.

It is preferred for the method to comprise the following step:

establishing the model freed of the tire parameters to be estimated on the basis of approximated tire parameters. And in particular the following further step:

using the estimated tire parameters as approximated tire parameters in the model, for estimating new tire parameters.

The method expediently comprises the following steps: detecting a variance of the reference movement, and estimating the tire parameters of the vehicle on the basis of the detected variance.

The method is preferably developed by the estimated tire parameters of the vehicle being regarded as valid if the reference movement and/or the model movement exceed(s) a specific value.

The method expediently comprises the following step: comparing the reference movement and the model movement on the basis of an observer.

With regard to the method in the tire parameter estimation unit the observer preferably a Kalman filter.

It is preferred for the signal processing device to have a fusion filter, which provides a defined fusion data set in the course of the joint evaluation of at least the sensor signals and/or signals derived therefrom of the sensor elements, wherein said fusion data set has in each case data with respect to defined physical variables, wherein the fusion data set comprises, with respect to at least one physical variable, a value of said physical variable and information about the data quality thereof.

It is preferred for the signal processing device to be designed such that the measurement data of physical variables are in each case assigned an item of time information which directly or indirectly comprises information about the point in time of the respective measurement, wherein the signal processing device takes account of this time information at least during the generation of the fusion data set in the fusion filter.

The sensor system is expediently arranged in a vehicle, in particular a motor vehicle, particularly preferably an automobile.

It is preferred for the fusion filter to be designed such that function steps are successively carried out, said function steps in each case being assigned an item of time information, wherein in the function steps data/values with respect to physical variables are in each case processed and fusion data sets are provided at defined points in time, said fusion data sets in each case providing a relative value of the physical variable and information about the data quality with regard to each physical variable which the fusion filter processes and/or calculates.

The fusion filter preferably has, at least with respect to one of the physical variables, internally an absolute value and/or internal value of said physical variable, wherein the absolute values and/or internal values of the previous function steps with respect to one or more physical variables are stored and kept ready for a defined time period.

It is expedient that, depending on the time information of the input values, of a physical variable, of the fusion filter, these input values are computed in the fusion filter by being compared and/or computed with the absolute value and/or internal value of the same physical variable whose time information, that is to say the time information of the absolute value and/or of the internal value, substantially corresponds to the time information of the input value.

It is preferred for the absolute value and/or internal value of the same physical variable with which the input value is compared and/or computed to be interpolated from the two absolute values and/or internal values that are temporally closest with regard to the time information and are stored and kept ready; in particular, they are the absolute value and/or internal value with time information which is somewhat younger and the absolute value and/or internal value with time information which is somewhat older than the time information of the assigned input value.

It is expedient for the input values of the fusion filter each to be assigned an item of time information, as a result of which these input values of physical variables each have a time rank, wherein in the context of the imminent function step the input values of physical variables of the fusion filter are computed with internal values of the fusion filter of the same physical variables which, in terms of the time rank and/or with regard to the time information, substantially correspond to the respective time information and/or to the time rank of the respective input variable.

The signal processing device is preferably designed such that the time rank of the currently imminent function step is defined by the time information of the input value of a physical variable with the youngest time information, wherein the input values of physical variables whose time information is older are extrapolated to the time rank of the youngest time information and are subsequently computed with internal values of the fusion filter.

It is preferred for the signal processing device to be designed such that the defined period of time in which data/information/values are stored and kept ready is defined by the maximum delay of the input data of the fusion filter, which is determined from the maximum difference in the time information of the measurement of a physical variable relative to the time information of a currently imminent function step of the fusion filter, wherein the maximum delay is defined, in particular, to be greater than or equal to the maximum expected delay of a measurement of a satellite navigation system which is part of the sensor system.

It is expedient for the signal processing device to be designed such that the defined period of time in which data/information/values are stored and kept ready is defined by a defined period of time which is embodied differently for some or each physical variable(s).

The sensor system preferably comprises a satellite navigation system, which provides a synchronization pulse and/or a synchronization method with which the time information of the fusion filter is synchronized with the time information of the satellite navigation system.

It is expedient for the satellite navigation system to provide distance data in each case between the assigned satellite and the vehicle or a variable dependent thereon and velocity information data in each case between the assigned satellite and the vehicle or a variable dependent thereon, which are transmitted as input values to the fusion filter, wherein these input values of physical variables of the satellite navigation system are computed in a time-corrected manner with internal values of the fusion filter by virtue of the internal values of said physical variables being extrapolated depending on the time information of the input values if the time information of the input values of said physical variables is older than time information of the currently imminent function step of the fusion filter, wherein in particular a gradient of the last two values of such a physical variable is used for extrapolation if these two values are based on two successive measurements between which no measurement of the same measurement variable failed.

It is preferred for the fusion filter to be designed such that it takes account of at least one model assumption based on the fact that the offset values and/or change values and/or correction values and/or error values, between one or more function steps of the fusion filter, change only to a limited extent or negligibly within the defined period of time for which, in particular, absolute values and/or internal values of physical variables are stored.

The invention is preferably based on the concept that, in order that the redundant measurement data of different sensors or sensor elements or optionally additionally of a satellite navigation system which are measured at different points in time are computed with one another in a fusion filter and in order that the advantages of the redundancy can be utilized in the context of a sensor fusion, it is advantageous to compute measurement variables and/or internal values of the fusion filter which are present in a manner associated with the same measurement point in time, in order to minimize the error between out-of-date measurement data which form the input values of the fusion filter with respect to current measurement data, the values with respect to the measurement data which are currently present in an imminent function step of the fusion filter.

The fusion filter is preferably designed such that the comparative values or internal values of physical variables of the fusion filter are buffer-stored for a certain time or a defined period of time, which should cover, in particular, all delay times of all input data, and then for the data fusion the appropriate internal value from the past is selected for the comparison and is computed with an input value. Specifically, this can be restricted for example by the sampling/sample rate/measurement points in time; a certain spacing interval between internal values of the filter and measurement data particularly preferably remains. Alternatively preferably the values are finely interpolated between two samplings of the filter to an extent such that a valid measurement value is present appropriately at the point in time of the measurement data. If the internal values from fusion and measurement data or input values, in each case of the same physical variable, are then present at the same point in time or with substantially identical assigned time information, they can be computed/fused with one another in a simple manner. Expediently, the data from the fusion are compared with those of the measurement data, and then the correction values are determined therefrom, which update the values of the fusion filter.

It is preferred that the signal processing device is designed such that all input values of the fusion filter are stored in each case together with the assigned time information for a defined period of time and that the absolute values and/or internal values of the previous function steps of the fusion filter with respect to one or more physical variables are stored together with the respectively assigned time information for a defined period of time. It is expedient for the time rank of the currently imminent function step to be defined by the time information of the input value of a physical variable with the youngest time information. Expediently, depending on the time information of the input values, of a physical variable, of the fusion filter, these input values are computed in the fusion filter by being compared and/or computed with the absolute value and/or internal value of the same physical variable whose time information, that is to say the time information of the absolute value and/or of the internal value, substantially corresponds to the time information of the input value. The result of this computation has the time rank or relates to the point in time of the time information which was assigned to the input variable and to the absolute value or internal value. On the basis of this result, one or more function steps are carried out by the fusion filter and calculated forward in time with the input data and absolute values or internal values that are respectively younger by a function step until there is present the result of the function step which has the time rank, or to which time information is assigned, which corresponds to the time rank of the function step currently imminent at the beginning of this calculation process, which time rank was defined by the time information of the input value of a physical variable with the youngest time information.

Preferably, a time rank is understood to mean absolute or relative time information or alternatively preferably a rank in a temporal order, alternatively in particular a combination of both.

The invention additionally relates to the use of the sensor system in vehicles, in particular motor vehicles, particularly preferably in automobiles.

BRIEF DESCRIPTION OF THE DRAWINGS

Further preferred embodiments are evident from the dependent claims and the following description of an exemplary embodiment with reference to FIG. 1.

FIG. 1 shows a schematic illustration of one exemplary embodiment of the sensor system provided for arrangement and use in a vehicle. In this case, the sensor elements and the satellite navigation system and the most important signal processing units of the signal processing device are illustrated as function blocks, as is their interaction among one another.

FURTHER DESCRIPTION

The sensor system comprises an inertial sensor arrangement 1, IMU, "inertial measurement unit", which is designed such that it can detect at least the accelerations along a first, a second and a third defined axis and at least the rates of rotation about said first, about said second and about the third defined axis, wherein the first defined axis corresponds to the longitudinal axis of the vehicle, the second defined axis corresponds to the transverse axis of the vehicle and the third defined axis corresponds to the vertical axis of the vehicle. These three axes form a Cartesian coordinate system, the vehicle coordinate system.

The sensor system comprises a strapdown algorithm unit 2, in which a strapdown algorithm is carried out, by means of which at least the sensor signals of the inertial sensor arrangement 1 are processed to form corrected navigation data and/or driving dynamics data. These output data of the strapdown algorithm unit 2 comprise the data of the following physical variables: the velocity, the acceleration and the rate of rotation in each case of the vehicle, for example relative to the three axes of the vehicle coordinate system and according to the example additionally in each case relative to a world coordinate system suitable for describing the orientation and/or dynamic variables of the vehicle in the world. Moreover, the output data of the strapdown algorithm unit 2 comprise the position relative to the vehicle coordinate system and the orientation in relation to the world coordinate system. In addition, the output data of the strapdown algorithm unit have the variances as information about the data quality of the physical variables mentioned above, at least some of them. According to the example, these variances are not calculated in the strapdown algorithm unit, but rather only used and forwarded by the latter.

The output data of the strapdown algorithm unit are, for example, additionally the output data 12 or output signals of the entire sensor system.

The sensor system additionally comprises wheel rotational speed sensor elements 3 for each wheel of the vehicle, according to the example four, which detect the wheel rotational speeds in each case of one of the wheels of the vehicle and in each case additionally detect the direction of rotation, and additionally a steering angle sensor element 3, which detects the steering angle of the vehicle. The wheel rotational speed sensor element and the steering angle sensor element form a sensor arrangement 3 for detecting the odometer information.

Furthermore, the sensor system comprises a satellite navigation system 4, which is designed such that it detects and/or provides the distance data in each case between the assigned satellite and the vehicle or a variable dependent thereon and velocity information data in each case between the assigned satellite and the vehicle or a variable dependent thereon. In addition, according to the example, the satellite navigation system 4 provides the fusion filter with a start position or start position information, at least at the start or switch-on of the sensor system.

The signal processing device of the sensor system additionally comprises a fusion filter 5. The fusion filter 5 provides a defined fusion data set 6 in the course of the common evaluation of at least the sensor signals and/or signals derived therefrom of the sensor elements 3, that is to say the odometer information, and the output signals of the satellite navigation system 4 and/or signals derived therefrom. Said fusion data set has in each case data with respect to defined physical variables, wherein the fusion data set 6 comprises, with respect to at least one physical variable, a value of said physical variable and information about the data quality thereof, wherein said information about the data quality is embodied as a variance according to the example.

The fusion data set 6 comprises, as the value of the at least one physical variable, a relative value, for example a correction value, also called offset value. According to the example, the correction value results in each case from the cumulated error values or change values that are provided by the fusion filter 5.

According to the example, the relative values of the respective physical variables of the fusion data set 6 are therefore correction values and variances. To put it another way, according to the example, the fusion data set 6 calculates an error budget which is provided as an input variable or input data set of the strapdown algorithm unit and is at least partly taken into account by the latter in its calculations. Said error budget comprises, as a data set or output data, at least correction values or error values of physical variables and in each case a variance, as information about the data quality, with respect to each value. In this case, the fusion filter transmits to the strapdown algorithm unit at least the correction values and variances with respect to the physical variables of velocity, acceleration and rate of rotation, in each case relative to the vehicle coordinate system, that is to say in each case the three components of these variables relative to said coordinate system, and the IMU orientation or the IMU orientation angle between the vehicle coordinate system and the coordinate system or the installation orientation of the inertial sensor arrangement 1 and the position relative to the world coordinate system.

The values of the physical variables of the fusion data set are calculated on the direct or indirect basis of the sensor signals of the sensor elements 3 and of the satellite navigation system 4, wherein at least some variables, for example the velocity and the position of the vehicle relative to the vehicle coordinates, are detected and utilized redundantly with respect to the data of the strapdown algorithm unit 2.

The fusion filter 5 is as is designed according to the example as an error state space extended sequential Kalman filter, that is to say as a Kalman filter which comprises a linearization, in particular, and in which the correction values are calculated and/or estimated and which operates sequentially and in this case uses/takes account of the input data available in the respective function step of the sequence.

The fusion filter 5 is designed such that in the course of a function step of the fusion filter always, asynchronously, the newest—available to the fusion filter—information and/or signals and/or data of the sensor elements 3, that is to say of the wheel rotational speed sensor elements and of the steering angle sensor element indirectly by means of a vehicle model unit 7, and of the satellite navigation system 4 directly or indirectly, are sequentially updated and/or included in the fusion filter and are taken into account during the calculation of the assigned function step of the fusion filters.

The vehicle model unit 7 is designed such that it calculates, from the sensor signals of the wheel rotational speed sensor elements 3 and of the steering angle sensor element 3, at least the velocity along a first defined axis, the velocity along a second defined axis and the rate of rotation about a third defined axis and provides them to the fusion filter 5.

According to the example, the sensor system comprises four wheel rotational speed sensor elements 3, wherein in each case one of the wheel rotational speed sensor elements is assigned to each wheel of the vehicle, wherein the vehicle model unit 7 is designed such that, from the sensor signals of the wheel rotational speed sensor elements and the steering angle, provided by the steering angle sensor unit, and/or the steering angle of each wheel, in particular detected by the steering angle sensor element for the front wheels and by means of at least one further steering angle sensor element for the rear wheels or at least from a model assumption for the rear wheels, said vehicle model unit directly or indirectly calculates the velocity components and/or the velocity, of each wheel, along/relative to the first and the second defined axis, wherein, from these eight velocity components and/or the four velocities respectively relative to the first and second defined axes, the velocity along a first defined axis, the velocity along a second defined axis and the rate of rotation about a third defined axis are calculated.

The sensor system or its signal processing device additionally comprises a tire parameter estimation unit 10, which is designed such that it calculates at least the radius, according to the example the dynamic radius, of each wheel and additionally calculates the cornering stiffness and the slip stiffness of each wheel and provides them to the vehicle model unit 7 as additional input variables, wherein the tire parameter estimation unit 10 is designed such that it uses a substantially linear tire model for calculating the wheel/tire variables. The input variables of the tire parameter estimation unit according to the example are in this case the wheel rotational speeds 3 and the steering angle 3, at least partly or completely the output variables or values of the strapdown algorithm unit 2, in particular the variances provided thereby in addition to the values of the physical variables, and the variances of the fusion filter 5, with respect to the physical variables which are the input variables of the tire parameter estimation unit 10.

The sensor system or its signal processing device additionally comprises a GPS error detection and plausibilization unit 11, which is designed such that, according to the example, it receives as input data the output data or output signals of the satellite navigation system 4 and at least partly the output data or output signals of the strapdown algorithm unit 2 and takes them into account in its calculations.

In this case, the GPS error detection and plausibilization unit 11 is additionally connected to the fusion filter 5 and exchanges data with the latter.

The GPS error detection and plausibilization unit 11 is designed, for example, such that it carries out the following method: method for selecting a satellite, comprising:

measuring measurement position data of the vehicle relative to the satellite on the basis of the GNSS signal, that is to say the Global Navigation Satellite System signal, the output signal or the output data of the satellite navigation system 4, determining reference position data of the vehicle that are redundant with respect to the measurement position data determined on the basis of the GNSS signal, and selecting the satellite if a comparison of the measurement position data and the reference position data satisfies a predetermined condition, wherein a difference between the measurement position data and the reference position data is formed for the purpose of the comparison of the measurement position data and the reference position data, wherein the predetermined condition is a maximum permissible error between the measurement position data and the reference position data, wherein the maximum permissible error is dependent on a standard deviation calculated on the basis of a sum of a reference variance for the reference position data and a measurement variance for the measurement position data, wherein the maximum permissible error corresponds to a multiple of the standard deviation in such a way that a probability that the measurement position data into a variation interval dependent on the standard deviation fall below a predetermined threshold value.

The sensor system or its signal processing device additionally comprises a standstill identification unit 8, which is designed such that it can identify a standstill of the vehicle and, in the case of an identified standstill of the vehicle, provides information from a standstill model at least to the fusion filter 5, in this case in particular the information that the rates of rotation about all three axes have the value zero and at least one position change variable likewise has the value zero and, in particular, the velocities along all three axes have the value zero. The standstill identification unit 8 is in this case designed according to the example such that it utilizes as input data the wheel rotational speeds or wheel rotational speed signals and the "raw" or direct output signals of the inertial sensor arrangement 1.

According to the example, the signal processing device calculates and/or uses a first group of data of physical variables whose values relate to a vehicle coordinate system and additionally calculates and/or uses a second group of data of physical variables whose values relate to a world coordinate system, wherein said world coordinate system is suitable in particular at least for describing the orientation and/or dynamic variables of the vehicle in the world, wherein the sensor system has an orientation model unit 9, which calculates the orientation angle between the vehicle coordinate system and the world coordinate system.

The orientation angle between the vehicle coordinate system and the world coordinate system is calculated in the orientation model unit 9 at least on the basis of the following variables: the velocity relative to the vehicle coordinate system, the velocity relative to the world coordinate system and the steering angle.

The orientation angle between the vehicle coordinate system and the world coordinate system is calculated according to the example in the orientation model unit 9 additionally at least on the basis of one or more of the following variables: orientation information of the vehicle relative to the world coordinate system, some or all of the correction values and/or variances of the fusion filter and/or the acceleration of the vehicle relative to the vehicle coordinate system and/or the world coordinate system.

The orientation model unit 9 uses some or all of the output data and/or output signals of the strapdown algorithm unit 2 for calculation.

The orientation model unit 9 is designed according to the example such that, in addition to the orientation angle, it also calculates and provides information about the data quality of this variable, in particular the variance of the orientation angle, wherein the orientation model unit 9 provides the orientation angle between the vehicle coordinate system and the world coordinate system and the information about the data quality of this variable to the fusion filter 5, and the fusion filter uses this orientation angle in its calculations and particularly preferably forwards the information about the data quality of this variable, in particular the variance of the orientation angle, to the strapdown algorithm unit 2.

While the above description constitutes the preferred embodiment of the present invention, it will be appreciated that the invention is susceptible to modification, variation, and change without departing from the proper scope and fair meaning of the accompanying claims.

The invention claimed is:

1. A sensor system arranged in a vehicle, the sensor system configured to output navigation data or driving dynamics data, the sensor system comprising:
   a plurality of sensor elements, wherein the plurality of sensor elements each detect different physical variables of the vehicle and each output a sensor signal of the different physical variables measured by the sensor elements,
   a signal processing device, wherein the signal processing device is configured to perform a joint evaluation of the sensor signals of the sensor elements, wherein the signal processing device has a strapdown algorithm unit configured to execute a strapdown algorithm for the output of navigation data or driving dynamics data,
   wherein the signal processing device has a fusion filter which configured to provide a defined fusion data set in a course of the joint evaluation of at least the sensor signals and/or signals derived therefrom of the sensor elements,
   wherein the fusion data set has in each case data with respect to defined physical variables, wherein the fusion data set comprises, with respect to at least one physical variable, a value of the physical variable and information about a data quality of the physical variable,
   wherein the relative values of the respective physical variables of the fusion data set are correction values which are assigned in each case a variance as information about the data quality thereof,
   wherein the output data of the strapdown algorithm unit additionally have the variances of the physical variables, and wherein the strapdown algorithm unit provides the output data to a vehicle system.

2. The sensor system as claimed in claim 1, wherein the fusion data set comprises a relative value, the relative value being a an offset value and/or change value and/or correction value and/or error value.

3. The sensor system of claim 1, wherein the fusion filter is a Kalman filter which iteratively carries out at least prediction steps and correction steps and provides at least in part the fusion data set.

4. The sensor system as claimed in claim 3, wherein the fusion filter is an error state space extended sequential Kalman filter, which comprises a linearization and in which error state information is calculated and/or estimated and/or which operates sequentially and in this case uses/takes account of input data available in the respective function step of the sequence.

5. The sensor system as claimed in claim 1, wherein the signal processing device is configured so that the fusion filter calculates and/or provides and/or outputs the fusion data set at defined points in time.

6. The sensor system as claimed in claim 5 wherein the signal processing device is configured to calculate in the course of a function step of the fusion filter (5) the newest information and/or signals and/or data of:
   the sensor elements by means of a vehicle model unit, and
   a satellite navigation system,
   are sequentially updated and/or included in the fusion filter and are taken into account during the calculation of the assigned function step of the fusion filter.

* * * * *